US005093010A

United States Patent [19]

Schilp

[11] Patent Number: 5,093,010

[45] Date of Patent: Mar. 3, 1992

[54] DR METHOD OF OPERATING A CENTRIFUGE FILTER

[75] Inventor: Reinhold Schilp, W rthsee, Fed. Rep. of Germany

[73] Assignee: Krauss-Maffei Aktiengesellschaft, Munich, Fed. Rep. of Germany

[21] Appl. No.: 621,744

[22] Filed: Dec. 3, 1990

[30] Foreign Application Priority Data

Dec. 4, 1989 [DE] Fed. Rep. of Germany ....... 3940057

[51] Int. Cl.[5] ............................................ B01D 21/26

[52] U.S. Cl. .................................... 210/744; 210/739; 210/746; 210/781; 210/86; 494/3; 494/10; 494/37

[58] Field of Search ................. 210/739, 744, 781, 85, 210/86, 91, 141, 143, 360.1, 746; 494/10, 37, 3

[56] References Cited

U.S. PATENT DOCUMENTS 3,117,233 1/1964 Mittelberger ......................... 210/86
3,141,846 7/1964 Laven .................................. 210/86
3,204,766 9/1965 Schmidt ............................... 210/86
4,014,498 3/1977 Broadwell et al. .................. 494/37
4,769,133 9/1988 Brookes et al. ...................... 210/86
4,968,295 11/1990 Neumann ............................. 494/10

FOREIGN PATENT DOCUMENTS 1036763 8/1958 Fed. Rep. of Germany .
1186411 1/1965 Fed. Rep. of Germany .
2441849 3/1976 Fed. Rep. of Germany .
2525232 12/1976 Fed. Rep. of Germany .
2649037 6/1977 Fed. Rep. of Germany .
3615013 6/1987 Fed. Rep. of Germany .
3726227 2/1989 Fed. Rep. of Germany .
218283 2/1985 German Democratic Rep. .

*Primary Examiner*—Robert A. Dawson
*Assistant Examiner*—David Reifsnyder
*Attorney, Agent, or Firm*—Herbert Dubno; Andrew Wilford

[57] ABSTRACT

A method of operating a drum centrifuge having a foraminous drum rotatable about an axis it is centered on comprises first filling a charge of a suspension into the drum while rotating it about its axis so that the charge forms an annular stratified body having an inner surface and the liquid phase of the body passes radially outward and leaves behind the solid phase as a filter cake and then refilling at least one additional charge of a suspension into the drum onto the filter cake while rotating the drum as in the preceding filling step to add the solid phase of the additional charge to the cake already in the drum. Then at least periodically the radial position of the inner surface of the body in the drum is detected and the dry point when the liquid phase has substantially passed radially out of the drum is ascertained to generate outputs corresponding to the detected radial positions and the times same are detected. The filter cake is then washed by passing a wash liquid therethrough for a time determined by the outputs and thereafter the washed filter cake is centrifuged for a time determined by the outputs.

5 Claims, 3 Drawing Sheets

DR METHOD OF OPERATING A CENTRIFUGE FILTER

FIELD OF THE INVENTION

The present invention relates to a filter-centrifuge system. More particularly this invention concerns a method of operating such a system.

BACKGROUND OF THE INVENTION

A standard drum centrifuge has a housing in which a foraminous drum is rotated at high speed about its axis. A suspension is fed to the interior of the drum so that it is thrown centrifugally against the wall thereof. At first the suspension forms an annular body in the drum having an inner surface centered on the axis, then the body stratifies and the liquid phase passes through the drum and the solid phase stays behind on the inner surface of the drum as a filter cake. This inner layer of liquid passes radially outward through the layer of solids until same is substantially dry. As a rule the drum is filled and refilled several times until the filter cake builds up to a desired depth. Then this cake is washed by passing a liquid through it, and then it is centrifuged to an extremely low moisture content. Subsequently a hot gas can be passed through it to further dry it, and finally it is physically stripped out of the drum, same is regenerated, and the cycle is restarted.

The level, that is the radial position relative to the drum rotation axis, of the inner surface of the annular body formed by the liquid and solid fractions can be sensed by a detector such as described in German patent document 3,726,227 filed 07 Aug. 1989 by peter Sedlmayer, or by a system such as described in patent application 07/614,808 filed 16 Nov. 1990 by Rainer Kampschulte. Such sensors can even detect when the liquid has run through the cake and the top of the body in the centrifuge is in fact formed by solids, the so-called dry point.

The centrifuging and drying time is fairly long compared to the time necessary to spin the liquid fraction out of each batch. Thus for maximum efficiency each batch must be as large as possible, capable of filling the drum inward to a level just below the inlet. On the other hand the filter cake must be reduced to a fairly low residual moisture content.

As discussed in East German patent 218,283 (D. Trumper), and in West German patents 1,036,763 (J. Hertrich), 1,186,411 (K. Zeppenfeld et al), 2,441,849 (H. Bitus), 2,525,232 (W. Schillig), 2,649,037 (H.Papezik), and 3,615,013 (P. Franzen) the rate at which the liquid level, distinguished from the underlying solids level, drops in the drum is a function of the composition of the fractions. The particle size of the solid fraction, viscosity of the liquid fraction, thickness of the filter cake, thickness of the base layer underlying the cake, and other factors all affect the rate at which liquid can be driven out of the suspension being filtered. Existing technology does not allow these factors to be taken into account, so the refilling time and cycling time are usually set somewhat longer than is strictly necessary to produce a filter cake of the desired low moisture content, since to err on the side of a too wet product is to produce something that will have to be recycled through the drum centrifuge before it can be used.

OBJECTS OF THE INVENTION

It is therefore an object of the present invention to provide an improved drum-centrifuge system and method of operating same.

Another object is the provision of such an improved drum-centrifuge system and method of operating same which overcomes the above-given disadvantages, that is which produces a filter cake of the desired low moisture content in the bare minimum amount of time necessary to do so.

SUMMARY OF THE INVENTION

A method of operating a drum centrifuge having a for aminous drum rotatable about an axis it is centered on according to this invention comprises first filling a charge of a suspension into the drum while rotating it about its axis so that the charge forms an annular stratified body having an inner surface and the liquid phase of the body passes radially outward and leaves behind the solid phase as a filter cake and then refilling at least one additional charge of a suspension into the drum onto the filter cake while rotating the drum as in the preceding filling step to add the solid phase of the additional charge to the cake already in the drum. Then at least periodically the radial position of the inner surface of the body in the drum is detected and the dry point when the liquid phase has substantially passed radially out of the rum is ascertained to generate outputs corresponding to the detected radial positions and the times same are detected. The filter cake is then washed by passing a wash liquid therethrough for a time determined by the outputs and thereafter the washed filter cake is centrifuged for a time determined by the outputs.

With the method according to this invention a sensor such as described in the above-identified patent application monitors the level of the body in the drum during filtering and washing, with either continuous or periodic sampling, so as to determine the change with respect to time of the level of the stratified liquid/solids body in the drum. Then the dry points, that is the instants when the sensor riding on the annular body in the drum is no longer riding on a liquid but on solids because the liquid level is below the solids level, are determined. From the change with respect of time of he level and the dry points it is possible to determine the optimal number of fill cycles, the optimal time to start the wash cycle, and the amount of time to centrifuge to produce the desired residual moisture content in the filter cake.

In this manner the fill, liquid-extracting, and washing steps are determined independently of how the apparatus is filled so that the throughput of the filter can be maximized while producing a uniform end product.

The invention is based on the surprising discovery that all factors affecting the filtering, washing, and drying time are seen in the speed at which the level changes during filtering and washing. These factors can themselves be the products of characteristics such as temperature, viscosity, particle, size, practice shape, and numerous other parameters of the machinery and of the material being filtered.

Changes from load to load can be compensated for by different cycle times so as to completely avoid producing loads that are too wet and that need retreatment. The necessary regeneration steps such as washing out, scraping, or replacing the filter medium are also indicated by the level change with respect to time and are automatically carried out. The process can work continuously and downstream devices like dryers can be used optimally.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
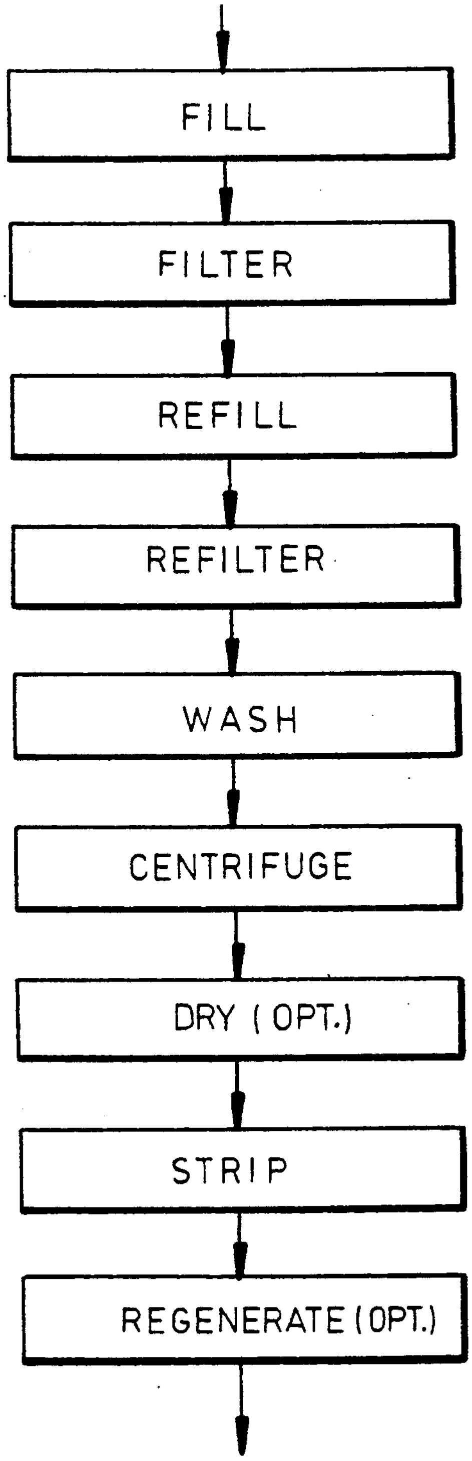
FIG. 1 is a flow diagram illustrating the method of this invention.

As seen in FIG. 1 a suspension is first filled into a drum centrifuge which is then spun at high speed to filter it. The drum is refilled with more suspension then and spun again to refilter it, and these two steps are repeated as often as necessary to achieve the desired thickness of the filter cake. The drum is then spun while a wash liquid is passed through the cake to strip all of the remaining liquid fraction from it, and then is spun without the addition of more suspension or liquid to dry the filter cake. A dry gas (or even drying liquid) may then optionally be passed through the filter cake which is thereafter stripped from the drum by means of a blade. Subsequently the filter is regenerated by changing the filter medium, flushing the stripped drum, or other standard procedures.

Figure 2:
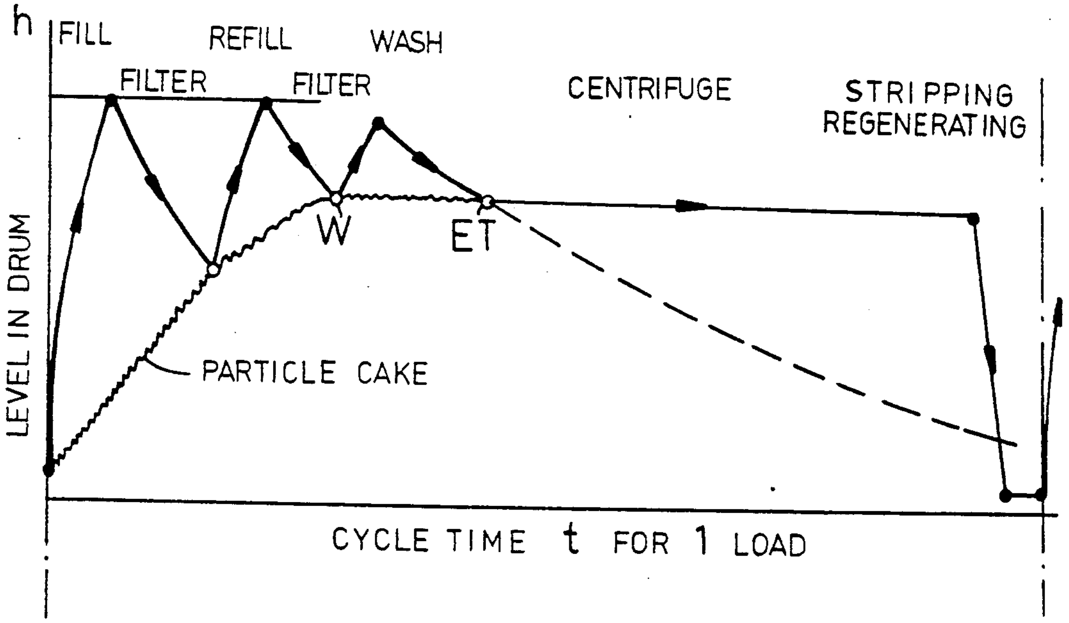
FIG. 2 is a graph illustrating one cycle of the method.

FIG. 2 shows in a solid line the depth of the body in the drum, the radial thickness h of the body being on the ordinate and time t being plotted on the abscissa. The sawtooth or squiggly line shows the increase in the thickness of the filter cake and the intersection of the sawtooth and solid lines, such as at W and ET, indicate the dry points achieved before and after washing. The dashed line shows the level of the liquid phase which is normally unimportant after it is below the level of the solids phase.

Figure 3:
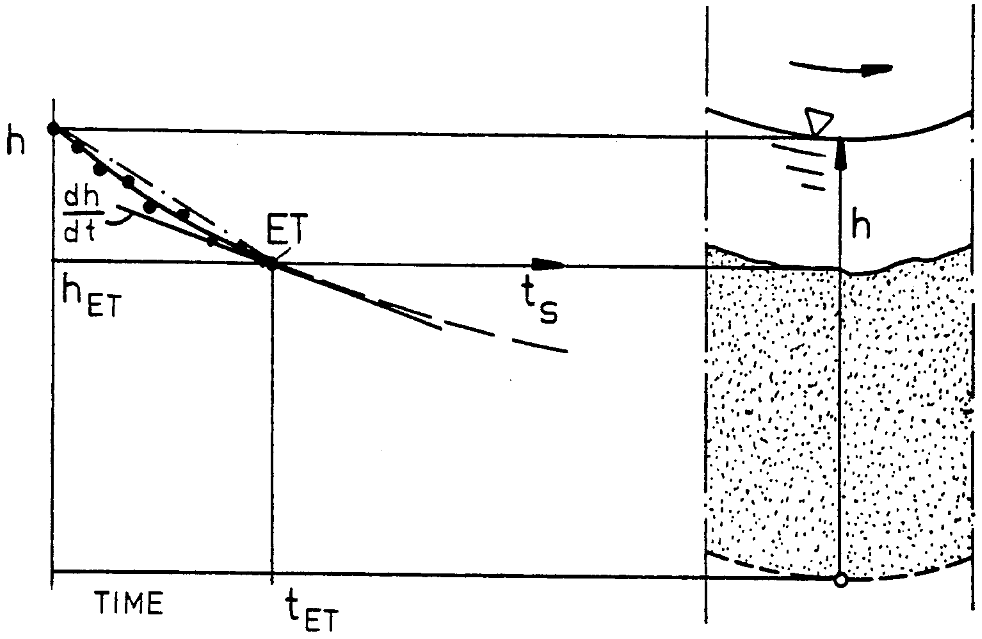
FIG. 3 is another graph showing the influence of the measurable parameters on the centrifuging time.

FIG. 3 schematically illustrates the decrease in level of the wash liquid before the centrifuging step. The decreasing height h is measured at regularly spaced intervals and is stored so that a microprocessor ca derive the differential quotient dh/dt. The entire level goes down, that is toward the drum axis, until the level $h_{ET}$ of the filter cake is reached, the so-called dry point at which the liquid has passed through the solids and the sensor S (FIG. 5) is resting directly on the filter cake. The time $t_{ET}$ at which this dry point is reached is recorded. At this instant the extraction by centrifuging and the centrifuging time $T_s$ starts. This time $t_s$ which is the largest part of the overall cycle length is therefore determined in accordance with the factors $H_{ET}$ and dh/dt as well as the machine sizes and a constant K determined by drum speed.

The changing filtration characteristics are dependent on the changing composition of the suspension being filtered For instance particle shape, average particle size (d-p50), the shape and slope of the sum curves of the particle-size analysis, proportion of fines, feed concentration, liquid temperature and viscosity are determinative. These production characteristics are set by the parameters $h_{ET}$ and dh/dt sufficiently accurately.

In order to reach the desired moisture content the following formula pertains:

$$tS \approx \{h_{ET}/h_{ETO}\}^{b} t_{so}\{(dh/dt)_o/dh/dt)\}^{c},$$

where:

K = a constant determined by the centrifuge, a, b, c = fixed exponents, $h_{ETO}$ = height of inner surface at dry point for the liquid phase, $t_{so}$ = a predetermined amount of time, h = height of inner surface at dry point for the wash liquid, h = the changing height of the inner surface, and $t_s$ = the centrifuging time.

Here the relationship of the filter-cake level at the dry point of the wash liquid $h_{ET}$ and at the dry point of the liquid phase of the charged-in suspension $h_{Eto}$ are formed. The speed reduction $(dh/dt)_o$ at the dry point of the liquid phase and the speed dh/dt at the dry point of the wash liquid are calculated and set relative to each other. The thus obtained values are raised to the exponents b and c and then multiplied by the machine constant $K^a$. Finally the thus obtained value is multiplied by the time value $t_{so}$ for a normal centrifuging step. The value $t_{so}$ can be calculated or determined empirically and does not change from fill to refill.

It is also possible instead to use instead of the values $h_{ETo}$ and $(dh/dt)_o$ values obtained from another centrifuging step or to put them together in a constant C so that $$t_s \sim C\, h_{Et}^{b}/(dh/dt)^{c}.$$

It is also advantageous to optimize the constants a, b, c, K, and $t_{so}$ during operation of the centrifuge drum in succeeding uses.

Figure 4:
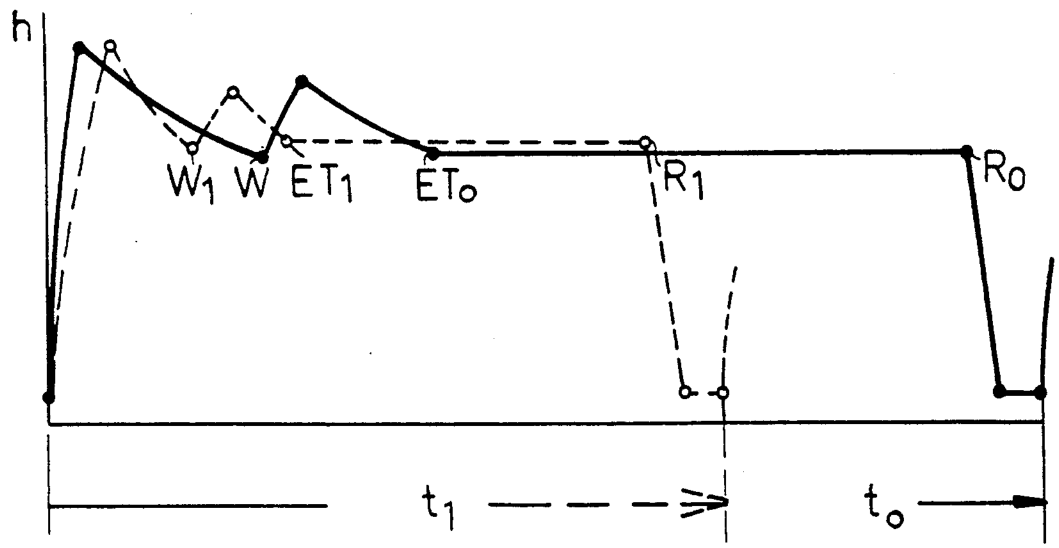
FIG. 4 is another graph showing the influence of changes on the suspension feed on the fill level with time.

FIG. 4 shows the curves for two different products to be filtered, one in a solid line one in a dashed line. The dashed-line product has a larger particle size so that it filters faster. Once the maximum level is reached the fill valve is closed and the level drops more quickly for the suspension with the coarser solid fraction. For it, once the dry point $W_1$ is reached the washing can start so that this procedure is finished at time $R_1$ much earlier than the regenerating time $R_o$ of the suspension with a finer solids fraction.

Figure 5:
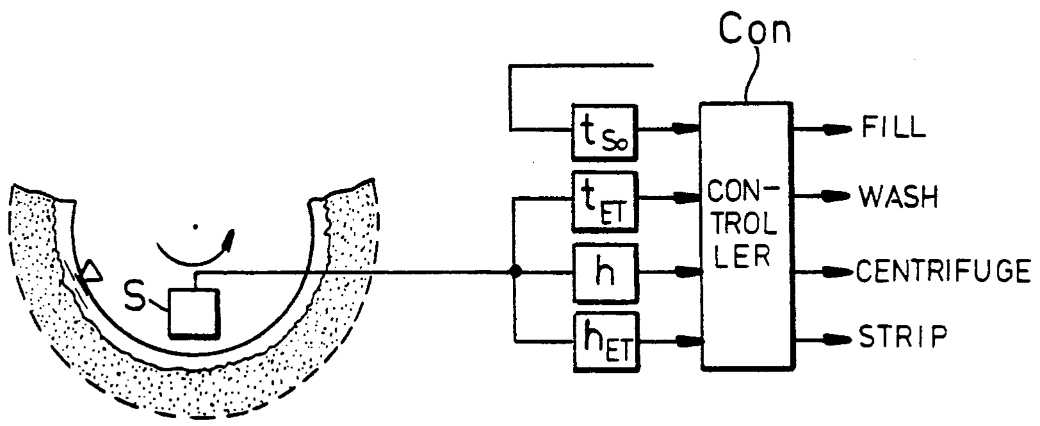
FIG. 5 is a block diagram illustrating the apparatus of this invention.

FIG. 5 schematically illustrates the control apparatus Con which receives from the sensor S the level and which itself keeps track of time to calculate the various velocities and curve slopes to control filling, washing, centrifuging, and stripping. In other words the values h and $h_{ET}$ are determined directly and compared with time by the controller Con. From the differential quotient dh/dt during filtering out of the liquid phase at dry point W and of the wash liquid at dry point ET the controller Con can calculate the centrifuging time in order to obtain a given residual moisture content at a point R. In determining the speed at which the liquid level drops in the rotating centrifuge drum it is possible instead of the differential quotient dh/dt to also used to use the average value of the linearized level decrease over time of the differential quotient $\Delta h/\Delta t$. Thus the controller Con can be analog or digital.

I claim:

1. A method of operating a drum centrifuge having a foraminous drum rotatable about an axis it is centered on, the method comprising the steps of:

a) filling a charge of a suspension into the drum while rotating it about its axis so that the charge forms an annular stratified body having an inner surface and a liquid phase of the charge passes radially outward and leaves behind a solid phase of the charge as a filter cake;

b) refilling at least one additional charge of a suspension into the drum onto the filter cake while rotating the drum as in step a) to add a solid phase of the additional charge to the cake already in the drum;

c) at least periodically detecting a radial position of an inner surface of the body in the drum and ascertaining a dry point when the liquid phase has substantially passed radially out of the drum and continuously generating outputs corresponding to a ratio formed by a differential quotient (dh/dt) of the detected radial position (h) and time (t);

d) washing the filter cake by passing a wash liquid therethrough for a time determined by the outputs; and e) thereafter centrifuging the washed filter cake for a time determined by the outputs.

2. A method of operating a drum centrifuge having a foraminous drum rotatable about an axis it is centered on, the method comprising the steps of:

a) filling a charge of a suspension into the drum while rotating it about its axis so that the charge forms an annular stratified body having an inner surface and a liquid phase of the charge passes radially outward and leaves behind a solid phase of the charge as a filter cake;

b) refilling at least one additional charge of a suspension into the drum onto the filter cake while rotating the drum as in step a) to add a solid phase of the additional charge to the cake already in the drum;

c) at least periodically detecting a radial position of an inner surface of the body in the drum and ascertaining a dry point when the liquid phase has substantially passed radially out of the drum and periodically generating outputs corresponding to a ratio formed by a differential quotient $\Delta h/\Delta t$ of the detected radial position (h) and time (t);

d) washing the filter cake by passing a wash liquid therethrough for a time determined by the outputs; and e) thereafter centrifuging the washed filter cake for a time determined by the outputs.

3. The operating method defined in claim 1, further comprising the step of deriving the dry point at which the liquid phase has passed entirely through the solid phase from the outputs.

4. The operating method defined in claim 1 wherein the centrifuging time is wholly determined by use of the outputs.

5. A method of operating a drum centrifuge having a foraminous drum rotatable about an axis it is centered on, the method comprising the steps of:

a) filling a charge of a suspension into the drum while rotating it about its axis so that the charge forms an annular stratified body having an inner surface and a liquid phase of the charge passes radially outward and leaves behind a solid phase of the charge as a filter cake;

b) refilling at least one additional charge of a suspension into the drum onto the filter cake while rotating the drum as in step a) to add a solid phase of the additional charge to the cake already in the drum;

c) at least periodically detecting a radial position of an inner surface of the body in the drum and ascertaining a dry point when the liquid phases has substantially passed radially out of the drum and generating outputs corresponding to the detected radial positions and the times same are detected;

d) washing the filter cake by passing a wash liquid therethrough for a time determined by the outputs; and e) thereafter centrifuging the washed filter cake for a time wholly determined by the outputs in accordance with the formula $$tS \approx K^{a}\{h_{ET}/h_{ETo}\}^{b}\, t_{So}\{(dh/dt)_{o}/dh/dt)\}^{c},$$

where:

$K$ = a constant determined by the centrifuge, a, b, c = fixed exponents, $h_{ETo}$ = height of inner surface at dry point for the liquid phase, $t_{So}$ = a predetermined amount of time, $h_{ET}$ = height of inner surface at dry point for the wash liquid, h = a changing height of the inner surface, and $t_s$ = the centrifuging time.

* * * * *